US006882315B2

(12) United States Patent
Richley et al.

(10) Patent No.: US 6,882,315 B2
(45) Date of Patent: Apr. 19, 2005

(54) OBJECT LOCATION SYSTEM AND METHOD

(75) Inventors: Edward A. Richley, Gaithersburg, MD (US); Robert J. Fontana, Potomac, MD (US); Donald V. Perino, N. Potomac, MD (US); Aitan Ameti, Germantown, MD (US)

(73) Assignee: Multispectral Solutions, Inc., Germantown, MD (US)

(*) Notice: Subject to any disclaimer, the term of this patent is extended or adjusted under 35 U.S.C. 154(b) by 394 days.

(21) Appl. No.: 09/978,750

(22) Filed: Oct. 18, 2001

(65) Prior Publication Data

US 2004/0108954 A1 Jun. 10, 2004

(51) Int. Cl.[7] .............................. G01S 3/02; G01S 1/24
(52) U.S. Cl. ...................................... 342/465; 342/387
(58) Field of Search ................................ 342/465, 463, 342/387

(56) References Cited

U.S. PATENT DOCUMENTS

| | | |
|---|---|---|
| 3,419,865 A | 12/1968 | Chisholm |
| 3,680,121 A | 7/1972 | Anderson et al. |
| 3,714,573 A | 1/1973 | Grossman |
| 4,740,792 A | 4/1988 | Sagey et al. |
| 4,916,455 A | 4/1990 | Bent et al. |
| 5,119,104 A | 6/1992 | Heller |
| 5,166,964 A | 11/1992 | Hasegawa et al. |
| 5,216,429 A | 6/1993 | Nakagawa et al. |
| 5,317,323 A | 5/1994 | Kennedy et al. |
| 5,469,409 A * | 11/1995 | Anderson et al. ............ 342/463 |
| 5,608,410 A * | 3/1997 | Stilp et al. .................. 342/387 |
| 5,859,613 A * | 1/1999 | Otto ........................... 342/463 |
| 5,920,287 A | 7/1999 | Belcher et al. |
| 5,995,046 A * | 11/1999 | Belcher et al. ............. 342/465 |
| 6,094,169 A | 7/2000 | Smith et al. |
| 6,184,829 B1 * | 2/2001 | Stilp ........................... 342/387 |
| 6,300,903 B1 * | 10/2001 | Richards et al. ............ 342/463 |
| 6,380,894 B1 * | 4/2002 | Boyd et al. .................. 342/465 |
| 2002/0039080 A1 * | 4/2002 | Wisherd et al. ............. 342/463 |
| 2002/0145563 A1 * | 10/2002 | Kane et al. .................. 342/465 |

OTHER PUBLICATIONS

Guaning Su et al., The signal subspace approach for multiple wide-band emitter location, IEEE Transactions on Acoustics, Speech, and Signal Processing, vol. 31(6), p. 1502–1522, Dec. 1983.*

S.P. Belanger, An EM algorithm for multisensor TDOA/DD estimation in a multipath propagation environment, IEEE Internation Conference on Acoustics, Speech, and Signal Processing, vol. 6, p. 3117–3120, May 1996.*

B. Friedlander et al., Localization of multiple targets by sensor arrays: a modeling approach, IEEE Conference on Decision and Control including the Symposium on Adaptive Processes, vol. 3, p. 1425–1430, Dec. 1981.*

* cited by examiner

Primary Examiner—Thomas H. Tarcza
Assistant Examiner—F H Mull
(74) Attorney, Agent, or Firm—McIntyre Harbin & King (57) ABSTRACT

An RF object locating system and method that uses or includes a set of N (N>2) receivers (monitoring stations) located at fixed positions in and/or about a region to be monitored, one or more reference transmitters that transmit a timing reference, a location processor that determines object location based on time-of-arrival measurements, and at least one object having an untethered tag transmitter that transmits RF pulses, which may additionally include object ID or other information. Free-running counters in the monitoring stations, whose phase offsets are determined relative to a reference transmitter, are frequency-locked with a centralized reference clock. Time-of-arrival measurements made at the monitoring stations may be stored and held in a local memory until polled by the location processor. The invention permits rapid acquisition of tag transmissions thereby enabling the monitoring of large numbers of objects, and also provides a unique approach to data correlation in severe multipath environments.

65 Claims, 9 Drawing Sheets

FIG. 6A $$\varepsilon = \sum_{j=1}^{N}\sum_{k=j+1}^{N}\left[(t_j - t_k) - \frac{1}{c}\left(\sqrt{(x-x_j)^2+(y-y_j)^2} - \sqrt{(x-x_k)^2+(y-y_k)^2}\right)\right]^2$$

FIG. 6B

PRIOR ART

OBJECT LOCATION SYSTEM AND METHOD

BACKGROUND

This invention relates to a radio frequency ("RF") object location method and apparatus. More specifically, this invention relates to system architecture, as well as an improved synchronization method and apparatus for locating an object in a multipath, reverberation, or other noisy environment.

RF location systems may be used to keep track of objects such as inventory, materiel, equipment, personnel, and other items. In such systems, objects to be located typically utilize individual transmitters or transponders, i.e., RF tags. To locate the object, various techniques have previously been used to process received signals.

In one prior systems, RF sensors (also referred to as "monitoring stations") were positioned at known coordinates within and/or about an area to be monitored. RF emissions from tags associated with the object were received and processed by these sensors. Signal processing schemes included measuring relative signal strength, angle of arrival (AOA), or time difference of arrival (TDOA or DTOA). Typically, systems based upon TDOA determined differences in the arrival time of the signal from the tag at one monitoring station relative to other monitoring stations. Measurement of time difference was often accomplished using a digital counter whose count was latched in response to receipt of an incoming RF signal. Systems based upon such TDOA measurements were sometimes referred to as a "multilateration" or "geolocation" system, which refers to the process of locating a signal source by solving for the mathematical intersection of multiple hyperbolae, which was determined by the difference of arrival times between signals received at multiple sensors.

In another class of prior systems as described, for example, in U.S. Pat. No. 4,740,792 and commonly-owned, incorporated U.S. Pat. No. 6,054,950, untethered monitoring stations relayed received signals via wireless links to a central measurement unit. Although well-suited for monitoring object location in large outdoor areas, or in applications where wiring was not feasible or too expensive to install, this approach required a transmitter and receiver at each station.

In another class of prior systems (cf. U.S. Pat. Nos. 3,714,573; 5,216,429; 5,920,287; and 6,121,926), tethered monitoring stations relayed radio frequency signals via cables to a central measuring unit. One drawback of this approach was signal dispersion in the cable. Generally, dispersion is a process by which an electromagnetic signal propagating in a physical medium becomes degraded due to various wave components, or frequencies, of the signal propagating at different velocities within the medium. Dispersion reduces the edge-rate or rise/fall times of the signals thereby degrading the ability of the system to accurately detect arrival time, and hence, position of the object.

In yet another class of prior systems (cf. U.S. Pat. Nos. 3,419,865; 3,680,121; and 4,916,455), measurement schemes were implemented at each of the monitoring stations to produce a digital result indicative of arrival times, angle of arrival, or other value. Advantageously, these systems conveyed digital data via interconnecting cables; and hence, position accuracy was not affected by cable dispersion. However, a drawback of this approach relates to the fact that these systems are plesiochronous, or "nearly" synchronous; i.e., timing reference signals were arbitrarily close in frequency (within some specified limits), but were not sourced from the same clock signal. Thus, over some period of time, the timing reference signals drifted with respect to each other. As each monitoring station had an independent clock source, small differences in clock frequencies degraded accuracy in position measurement.

Yet another class of prior systems included synchronous systems, i.e., those in which the timing reference signals were derived from a common source. In some synchronous systems (cf. U.S. Pat. Nos. 5,317,323 and 6,094,169), a local timing reference clock was derived from a Global Positioning Satellite (GPS) timing source. While this was suitable for frequency synchronization in benign outdoor conditions, monitoring stations operating indoors or in urban environments could not generally rely upon receiving a GPS timing signal, and consequently, object location could not be determined.

U.S. Pat. No. 5,119,104, for example, describes synchronization scheme in which a timing reference clock was provided at each monitoring station receiver by way of a local area network (LAN) cable. At each monitoring station, the clock signal incremented a digital counter that latched a count value upon receiving an RF signal arriving at an associated receiver of the monitoring station. Advantageously, this particular approach guaranteed that all counters operate at the same clock frequency. However, a drawback was the lack of a provision to reset the counters or otherwise control the relative phase between them. Non-compensated phase offset between counters degraded position accuracy. Furthermore, in the system described in the '104 patent, each of the monitoring stations included a data communication controller that responded to the receipt of an object tag transmission and, upon receipt thereof, sent a corresponding time of arrival (TOA) detection packet to a centrally located processor. In other words, such system was interrupt-driven where receipt of a tag transmission signal invoked an interrupt. A serious drawback of this approach was that, upon receiving a first tag transmission, the system was temporarily "disarmed" and thus unable to process a second tag transmission until the network completed the transfer of measurement data. Thus, it was possible that one or more tag transmissions were lost in the process.

Phase offset between counters can be controlled by a synchronizing or counter reset signal. U.S. Pat. Nos. 3,680, 121 and 4,916,455, for example, disclose location systems utilizing an RF synchronizing signal that was transmitted to each monitoring station in the monitored region. To avoid interference, the synchronizing signal was transmitted at a frequency distinct from that of the tag transmission. Thus, one drawback of this approach was that each monitoring station had to be equipped with two distinct RF receivers—a first to sense the tag transmission and a second to sense the synchronization signal. Alternatively, the system disclosed by U.S. Pat. No. 3,419,865 included a cable interconnecting a central unit and each monitoring station to enable "adjusting their time clocks to precise mutual synchronization." A drawback of this approach, however, was signal dispersion in the cable, which reduced pulse sharpness and timing accuracy of the synchronizing signal.

Synchronizing or calibration methods applicable to radio frequency location systems are also known (cf. U.S. Pat. Nos. 4,916,455; 5,119,104; and 6,094,169). A general synopsis of a calibration technique is provided in the '455 patent, in which it is stated that "[i]n order to achieve the high accuracy, the system was periodically calibrated. System calibration was accomplished by periodically transmitting a modulated signal (with a unique calibration identity code) from a known location. The transition times of arrival derived therefrom were then transmitted to a central analyzer for time-difference processing. The resulting time differences were then compared to known values and error magnitudes were then used to compensate corresponding station-pair time differences resulting from other unknown-location transmissions."

The need for calibration is also summarized in the '104 patent as follows. "To operate the radiolocation system with TOA resolution in nanoseconds, minute changes in circuit operational parameters and propagation characteristics, such as might result from changes in temperature and humidity within the facility, had to be taken into account. Such changes were accommodated through system calibration".

Another problem unique to object location or asset tracking is that, in order to accurately determine position, a minimum number of receivers at the monitoring stations (i.e. typically three receivers) must have a direct (i.e., a line-of-sight or, at most, an attenuated line-of-sight) transmission path. However, due to the nature of indoor environments, there may only be a limited number of such direct transmission paths. For example, walls, machinery, containers, and other materials may create signal attenuation or even complete signal blockage. Thus, there may exist certain zones within the monitored area in which position accuracy may be degraded for lack of adequate signal reception. A solution to this problem was to provide redundant monitoring stations. However, in providing such redundancy, it becomes possible, and in fact likely, that more than the minimum number of monitoring stations will receive a given transmission. Such a system is often referred to as an "over-specified" or "over-determined" system.

A potential drawback of using an over-determined system relates to the fact that hyperbolic ranging algorithms can calculate more than one mathematically valid position. That is, ambiguities in position determination can arise. Various techniques have been applied to address this issue. For example, U.S. Pat. No. 5,166,694 discloses a method of computing a vehicle location in an overdetermined system. One aspect of the '694 patent is the use of a pre-filter to "remove any signals that were corrupted by anomalies in the propagation of the transmitted signal." In particular, the specification thereof describes a "multipath feasibility circle" that is determined by a system parameter that is an estimated maximum speed of the vehicle containing the transmitter. A drawback of this approach is that it is possible for a signal to have a propagation anomaly and yet not produce an error sufficiently large enough to cause it to be filtered out.

In commonly-owned U.S. Pat. No. 6,054,950 referenced above, ultra wideband (UWB) waveforms were employed to achieve extremely fine, centimeter-type resolution because of their extremely short (i.e., subnanosecond to nanosecond) durations. This patent also treats the use of UWB, or short pulse, technologies to provide an improved radio locating system and method for asset tracking that addresses the identified shortcomings of prior systems. However, the methods identified in the '950 patent are equally applicable to wideband pulse and spread spectrum RF technologies.

SUMMARY OF THE INVENTION

In view of the foregoing, it is a feature of the present invention to provide highly accurate position measurements (e.g. +/−1 foot or better) by providing a measurement apparatus, preferably utilizing UWB signals, that is disposed at each of the monitoring stations; a timing reference clock to synchronize the frequency of counters within the measurement apparatus; and a reference transmitter, preferably a UWB transmitter, positioned at known coordinates to enable phase offset between counters to be determined. It is also a feature of the present invention to operate in areas where GPS is unavailable by providing this timing reference clock to each UWB monitoring station via a wired link.

It is another feature of the present invention to locate an object in degraded multipath signal environments using a nonlinear optimization technique to process indications of differential times of arrival measurements.

It is yet another feature of the present invention to minimize intervals of non-operation (i.e. times when measuring apparatus are disarmed) by providing a TOA measurement memory disposed in each monitoring station to hold measurement data until polled by a central location processor.

It is yet another feature of the present invention to provide in the tag transmission a sequential burst count (e.g., a packet sequence number) from each object tag transmitter in order to permit, at the location processor, correlation of TOA measurement data.

These and other features, objects, or advantages will become more readily apparent upon review of the following description taken in connection with the accompanying drawings. The invention, though, is pointed out with particularity by the appended claims.

In accordance with a first aspect of the invention, there is provided an object location system for determining the position of an object in a monitored region comprising an object tag that transmits a tag signal in the monitored region, a reference transmitter having a known location to transmit a timing reference signal in the monitored region; at least two monitoring stations positioned at known locations where each of the monitoring stations have a common clock source and a respective time counting device that measures increments of time, a receiver that receives the timing reference signal and the tag signal, a processor to detect time of arrival of said tag signal and to determine an offset (skew) of the time counting device relative to the timing reference signal, and a location processor that receives the respective offsets and measured time-of-arrival information from said monitoring stations to determine the position of the object.

In accordance with another aspect of the invention, there is provided a method of determining the position of an object in a monitored region that comprises transmitting an RF tag signal from an object to be located, transmitting a timing reference signal from a known location, providing a common clock signal to plural linked monitoring stations, measuring at the monitoring stations the times of arrival of the timing reference signal and the tag signal, adjusting measured times of arrival according to relative offsets among the monitoring stations, and determining the position of the object according to the relative offsets and the measured times of arrival of the tag signal at the respective monitoring stations.

Other aspects, features, and embodiments of the invention will become apparent upon review of the succeeding description taken in connection with the accompanying drawings. The invention, though, is pointed out with particularity by the appended claims.

DESCRIPTION OF ILLUSTRATIVE EMBODIMENTS

Figure 1:
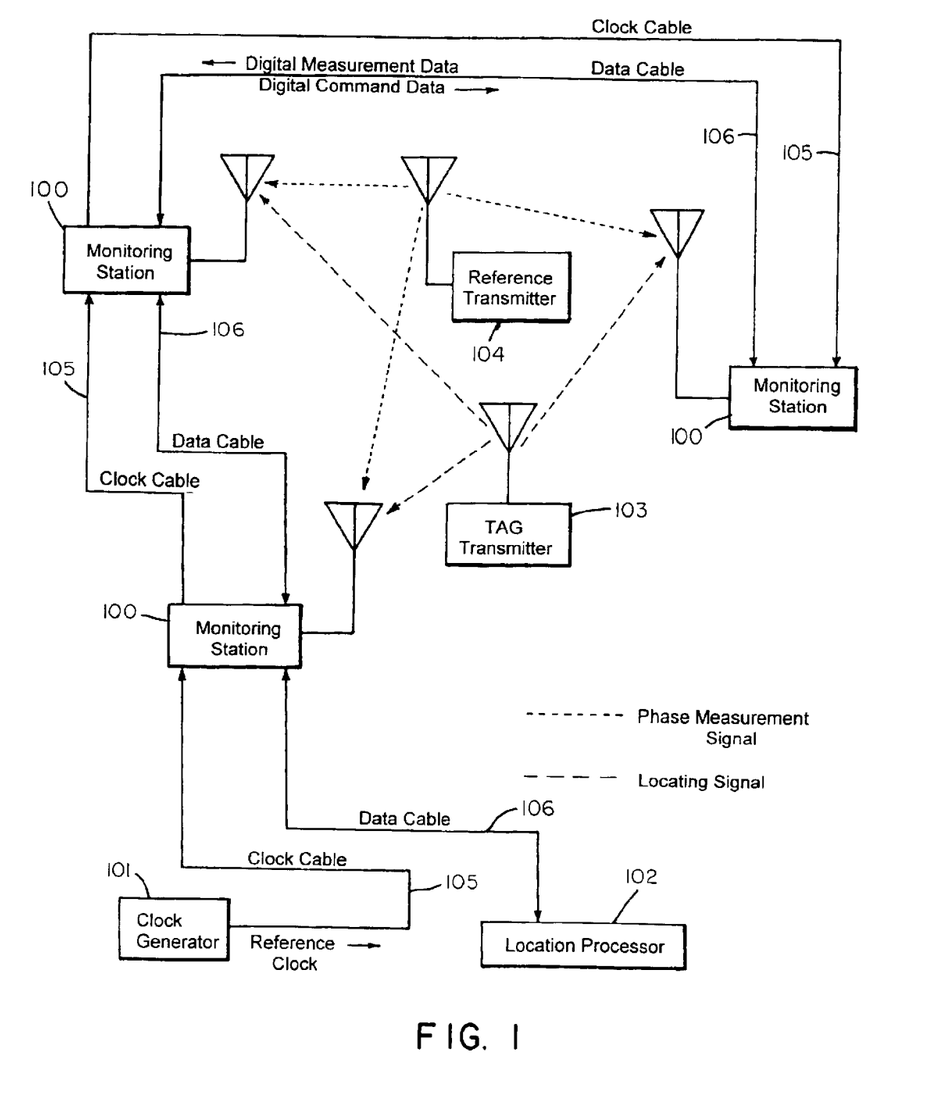
FIG. 1 depicts a radio locating system for object location or asset tracking in which clock and data signals are daisy-chained.

FIG. 1 shows a radio frequency locating system useful for determining the position of an object. The object to be located has an associated transmitter 103, preferably an UWB transmitter, that transmits a TOA timing pulse, and optionally, an information packet that may include, but not limited to, ID information and a sequential burst count. At least one other transmitter, depicted as reference transmitter 104, is positioned within and/or about a monitored region.

One or more (preferable three or more) monitoring stations 100 are also positioned at predetermined coordinates within and/or around the monitored region. These monitoring stations sense signals transmitted by the object tag 103 and reference transmitter 104. Each of the monitoring stations 100 includes a receiver for receiving transmissions (preferably UWB transmissions), and preferably, a packet decoding circuit that extracts a TOA timing pulse train, transmitter ID, packet number and/or other information that may have been encoded in the tag transmission signal (e.g., materiel description, personnel information, etc.).

In addition, each monitoring station 100 includes a time measuring circuit that measures the arrival time of a TOA timing pulse. The time measuring part is frequency-locked with a common digital reference clock signal distributed via cable from a central timing reference clock generator 101. Thus, multiple time measuring circuits of the respective monitoring stations 100 are synchronized in frequency, but not necessarily in phase. While there typically may be a phase offset between any given pair of receivers in the monitoring stations 100, the offset is readily determined through use of reference transmitter 104, as described below.

Preferred Algorithm

1. For calibration purposes, a reference tag transmitter is positioned at a known coordinate position $(x_T, y_T, z_T)$.
2. A number N of monitoring stations $\{R_j: j=1, \ldots, N\}$ (e.g., monitoring stations 100) are positioned at known coordinates $(x_{Rj}, y_{Rj}, z_{Rj})$, which are respectively located at distances $$d_{Rj} = \sqrt{(x_{Rj}-x_T)^2+(y_{Rj}-y_T)^2+(z_{Rj}-z_T)^2}$$

from the reference tag transmitter of step 1 above.

3. Each monitoring station $R_j$ utilizes a synchronous clock signal derived from a common frequency time base, such as clock generator 101 (FIG. 1). Because the monitoring stations are not synchronously reset, an unknown, but constant offset $0j$ exits for each monitoring station 100's internal free running counter. The value of the offset $0j$ is measured in terms of the number of fine resolution count increments (e.g., a number of nanoseconds for a one nanosecond resolution system).

4. The reference tag transmitter of step 1 above is used to calibrate the object location system as follows:

The reference tag transmitter emits a signal burst at an unknown time $\tau_R$. Upon receiving the signal burst from the reference tag transmitter, a count $N_{Rj}$ as measured at monitoring station $R_j$ is given by $$N_{Rj} = \beta\tau_R + 0j + \beta d_{Rj}/c$$

where c is the speed of light and $\beta$ is the number of fine resolution count increments per unit time (e.g., one per nanosecond).

Similarly, each object tag $T_i$ of each object to be located transmits a signal at an unknown time $\tau_i$ to produce a count $$N_{ij} = \beta\tau_i + 0j + \beta d_{ij}/c$$

at monitoring station $R_j$, where $d_{ij}$ is the distance between the object tag $T_i$ and the receiver at monitoring station $R_j$. Note that $\tau_i$ is unknown, but has the same constant value for receivers of all monitoring stations $R_j$.

Based on the equalities expressed above for monitoring stations $R_j$ and $R_k$ and given the reference tag information, differential offsets expressed as differential count values are determined as follows:

$$N_{Rj} - N_{Rk} = (0j - 0k) + \beta(d_{Rj}/c - d_{Rk}/c)$$

or, $$(0j - 0k) = (N_{Rj} - N_{Rk}) - \beta(d_{Rj}/c - d_{Rk}/c) \equiv \Delta_{jk}.$$

Note that $\Delta_{jk}$ is a known quantity, since $N_{Rj}$, $N_{Rk}$, $\beta$, $d_{Rj}/c$, and $d_{Rk}/c$ are known. That is, the differential offsets between monitoring stations $R_j$ and $R_k$ may be readily determined based on the reference tag transmissions.

Thus, again from the above equations, for an object tag ($T_i$) transmission arriving at monitoring stations $R_j$ and $R_k$:

$$N_{ij} - N_{ik} = (0j - 0k) + \beta(d_{ij}/c - d_{ik}/c) = \Delta jk + \beta(d_{ij}/c - d_{ik}/c)$$

or, $$d_{ij} - d_{ik} = (c/\beta)[N_{ij} - N_{ik} - \Delta jk].$$

5. The process further includes determining a minimum error value $E_i$, for each object tag $T_i$, according to the functional relationship:

$$E_i = \min_{(x,y,z)} \sum_j \sum_{k>j} [(d_{ij} - d_{ik}) - (dist(T_{x,y,z}, R_j) - dist((T_{x,y,z}, R_k)))]^2$$

where $dist(T_{x,y,z}, R_j) \equiv \sqrt{(x_{R_j}-x)^2+(y_{R_j}-y)^2+(z_{R_j}-z)^2}$
is the Euclidean distance between point (x,y,z) and the coordinates of the $j^{th}$ monitoring station $R_j$. The minimization solution (x',y',z') is the estimated coordinate position for the $i^{th}$ tag.

Each monitoring station 100 further includes a local memory that temporarily stores TOA counter measurements along with corresponding transmitter ID codes, packet numbers and/or other data that may be contained in the transmission. Upon request from a location processor 102 (preferably centrally located), the stored information is transmitted over a set of data links. These links are connected in a "daisy-chain" fashion between multiple monitoring stations 100. Using stored digital information, central location processor 102 resolves the coordinates of the object tag transmitter using nonlinear optimization techniques.

In certain environments, signal blockage may prevent one or more monitoring stations 100 from receiving a given object tag transmission. This loss of signal may lead to an irregular or interrupted sequence of time-of-arrival (TOA) measurements. In order to identify which TOA measurements correspond to the same associated set of tag transmissions stemming from a reference pulse, a sequence burst count number is preferably transmitted with each successive transmission. This, in effect, amounts to a packet ID code that is unique to each of multiple, sequential packet or signal transmissions.

As evident from the foregoing, the invention includes at least three primary aspects:

(1) A first aspect is drawn to system architecture for a radio frequency object locating system, which is optimized to the task of object location.

(2) A second aspect concerns a method of and apparatus for compensating for phase skew between counters of multiple monitoring stations, which counters are used to measure differential arrival times of received signals.

(3) A third aspect relates to an improved method of and apparatus for determining the position of an object using nonlinear optimization techniques to measure differential times of arrival.

FIG. 1 illustrates a preferred system architecture in accordance with the first aspect of the present invention. Monitoring stations 100 are positioned at known coordinates within or about the periphery of the area to be monitored. For simplicity, FIG. 1 shows only three such monitoring stations 100, but to obviate obstructed paths, a typical embodiment may utilize more than three. The monitoring stations 100 detect RF signals (preferably UWB transmissions) transmitted by a tag transmitter 103 associated with an object to be located, as well as phase measurement information in relation to signals transmitted by a reference transmitter 104. For simplicity, only one tag transmitter 103 is illustrated, but a typical system may detect a larger number of such transmitters.

Each tag transmitter 103 preferably transmits a UWB data packet. Such transmissions can occur periodically, aperiodically or randomly, or can be prompted or initiated by an external source or event. Transmitted UWB data packets may include an ID code, a Sequential Burst Count Number, or other desired information for object or personnel identification, inventory control, etc. The tag transmitter 103 may also include a circuit, responsive to a tag ID code, used to adjust an interval between transmitted data packets. In this fashion, it is possible to operate each object tag transmitter at a unique packet repetition rate so as to prevent packet collisions from occurring over extended periods of time.

Data cables 106 convey measurement data from the monitoring stations 100 to the location processor 102. Generally, the location processor 102 determines or computes tag position, i.e., object position, by processing time-of-arrival measurements relative to multiple data packets detected by the monitoring stations 100. Processor 102 may also display position information and/or send results thereof to a database program according to well-known techniques.

Figure 2:
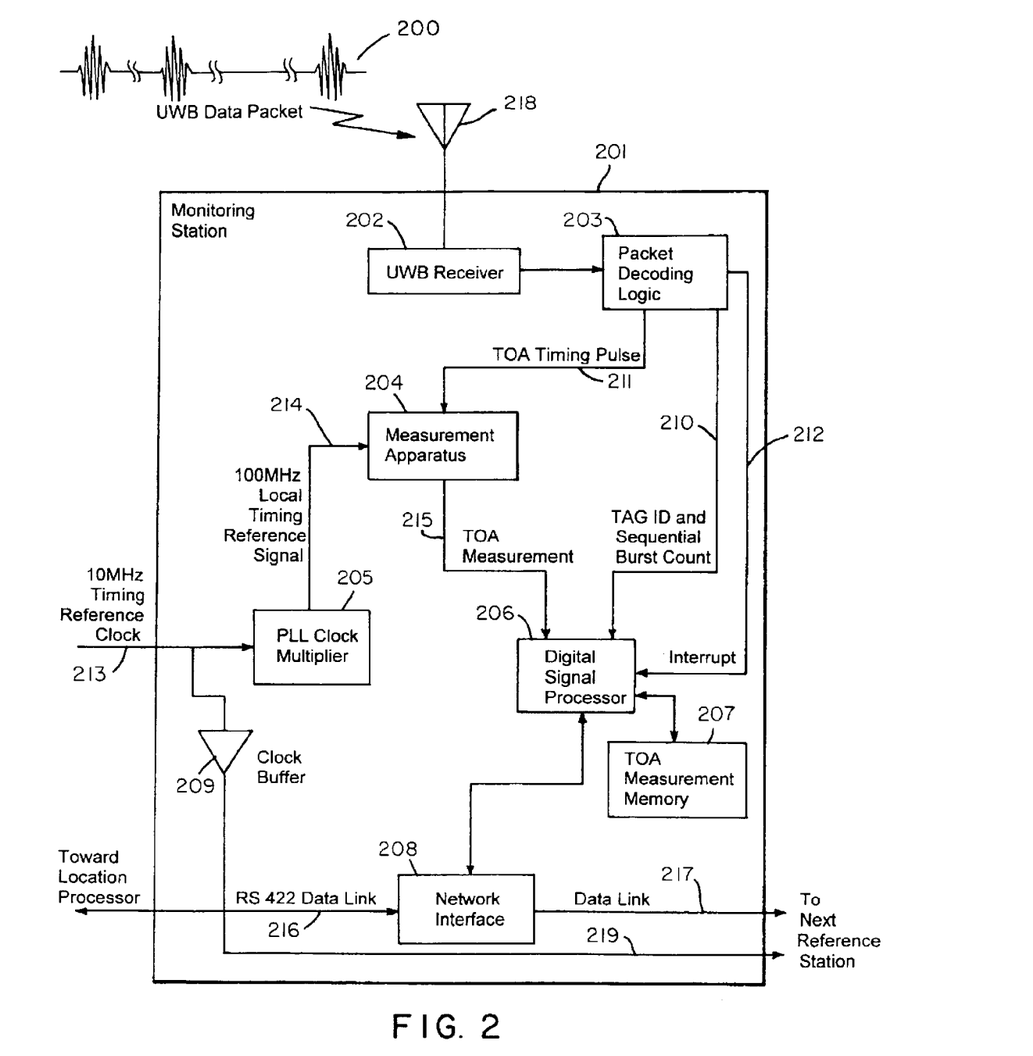
FIG. 2 illustrates a simplified block diagram of a monitoring station.

FIG. 2 shows a block diagram of a monitoring station 100 (FIG. 1), which illustrates a measurement apparatus 204 at each of the monitoring stations which performs calculations to determine various attributes of the received signal. This contrasts with certain prior systems that essentially relay raw signal data to a central location where calculations were there performed. Since computations are performed or measurements are determined at each monitoring, digital, rather than analog, signals are transmitted to the location processor 102. Thus, cable dispersion, which may degrade the integrity of analog waveforms, is avoided.

The above-described synchronizing scheme provides other advantages. To accomplish synchronization, a central clock generator 101 (FIG. 1) transmits a reference clock signal to each of the monitoring stations 100 via cables 105. The reference clock signal establishes a common timing reference for the monitoring stations 100. Such a synchronous system dramatically improves time measurement accuracy over certain prior plesiochronous systems. Furthermore, by providing cable 105 to distribute reference clock signals, the present invention need not rely on external radio frequency transmissions for synchronization.

Another preferred characteristic of the invention includes positioning a reference transmitter 104 (FIG. 1) at known coordinates. This reference transmitter 104 transmits a signal that is used to measure the relative phase (e.g., the count of free-running counters) of non-resetable counters within monitoring stations 100, which is described in conjunction with FIG. 4.

A further feature of the invention includes connecting clock cables 105 and data cables 106 in a "daisy chain" fashion between monitoring stations 100. At each monitoring station 100, the distributed reference clock and data signals are buffered and conditioned. Advantageously, this allows a large number of monitoring stations 100 to be interconnected over a significant monitored region without concern for signal loading. However, one skilled in the art will realize that other network topologies may also be employed.

In a preferred embodiment, Ultra Wideband (UWB) radio data packets 200 (FIG. 2) are transmitted to the monitoring station 201 and intercepted by UWB antenna 218. A UWB receiver 202 is provided at each monitoring station. The receiver can, for example, be designed in accordance with the system described in commonly-owned, incorporated U.S. Pat. No. 5,901,172.

UWB receiver 202 produces a digital bit stream that is processed by packet decoding logic 203, which performs packet framing and bit timing as part of an isochronous communication system. In an isochronous system, the communication signals carry timing information embedded as part of the signal. Upon receiving a complete UWB data packet, packet decoding logic 203 generates and sends an interrupt signal on line 212 to the digital signal processor (DSP) 206. Tag ID and a sequential burst count 210 are also extracted from the packet, and are sent to the DSP for further processing. Packet decoding logic 203 also generates a TOA timing pulse 211 that is precisely referenced in time relative to the beginning or end of a UWB data packet synchronization preamble. The synchronization preamble may comprise a few bits of data having a unique pattern at the beginning of the UWB packet burst so that the UWB receiver 202 may determine the validity of the received packet as well as bit time alignment. The TOA timing pulse is subsequently measured by measurement apparatus 204, which functions as a time-to-digital converter. An output TOA measurement 215 is a digital result that is determined in response receipt of the TOA timing pulse.

Upon receiving an interrupt signal, DSP 206 reads the TOA measurement 215 along with the optional tag ID and sequential burst count 210, and stores the combined information in the TOA measurement memory 207. Any additional information decoded by the packet decoding logic 203

(e.g., personnel data, cargo manifest, etc.) can also be stored in memory at this time. In a preferred embodiment, the TOA measurement memory 207 operates as a First-In First-Out (FIFO) buffer. Also, in the preferred embodiment, a program (which is typically stored in a FLASH memory, not shown) manages a portion of a general-purpose static RAM to function as the TOA measurement memory FIFO.

An important feature of the present invention is that, because packet data and measurement results can be transferred at high speeds to TOA measurement memory, the monitoring station 201 can receive and process tag (and corresponding object) locating signals on a nearly continuous basis. That is, multiple UWB data packets can be processed in close succession thereby allowing the use of hundreds to thousands of tag transmitters. In contrast, the system described in the '104 patent, for example, disarms the radio monitoring station receivers while data is transferred over a local area network, It is disadvantageous to disarm receivers for such significant periods of time (i.e. while the transfer over the LAN takes place) since transmissions from other tag transmitters are lost during this interval.

In accordance with the preferred operation of the present invention, data stored in TOA measurement memory 207 is sent to the location processor 102 (FIG. 1) over a network interface 208 in response to a specific request from the location processor. Thus a low-cost, high-latency data network can be used while retaining the ability to continuously receive tag locating signals.

In addition, network interface 208 has two bi-directional data links, 216 and 217. In the preferred embodiment, these data links are RS422 differential serial links. The network interface 208 receives command signals from the location processor 102 on link 216. For example, one such command instructs the DSP 206 to transfer the contents of the TOA measurement memory 207 to the location processor 102. Additional commands include those to adjust UWB receiver operating characteristics such as gain and detection thresholds. The network processor 208 also buffers the data signals between links 216 and 217. Data link 217 then connects to the next monitoring station in the communications chain.

Within the monitoring station 201, a distributed timing reference clock signal on line 213 is frequency-multiplied using well-known techniques by phased-lock loop (PLL) clock multiplier 205 (e.g., Pericom PI6C918AW), thereby producing a local timing reference signal on line 214. In one embodiment of the invention, timing reference clock signal on line 213 has a clock frequency of 10 MHz, and the local timing reference signal on line 214 is generated at 100 MH (i.e., a 10x digital multiplication factor). An advantage of this approach is that the distributed timing reference clock signal can be made low enough in frequency so that it can be transmitted over low-cost cables (e.g., twisted pair wires). Since timing jitter of the local timing reference signal degrades as the PLL multiplier coefficient is increased, there is a necessary trade-off between frequency and jitter of the local timing reference signal and the frequency of the timing reference clock.

Utilizing a common timing reference clock, a plurality of local timing reference signals (one in each monitoring station) can be precisely matched in frequency. Clock buffer 209 creates a buffered copy of the timing reference clock signal at one monitoring station to be transmitted to the next monitoring station in a daisy chain fashion. Using this approach, additional monitoring stations can be connected without concern for clock loading. Buffer delay is also not an issue since the timing reference clock is used for frequency only, and not phase, reference.

In a preferred embodiment, clock signals 213 and 217 are RS422 differential signals. The use of differential clock signals is advantageous since they avoid clock duty cycle distortion which can occur with the transmission of relatively high-speed clocks (e.g., >10 MHz) on long cables (e.g., >100 feet).

Figure 3:
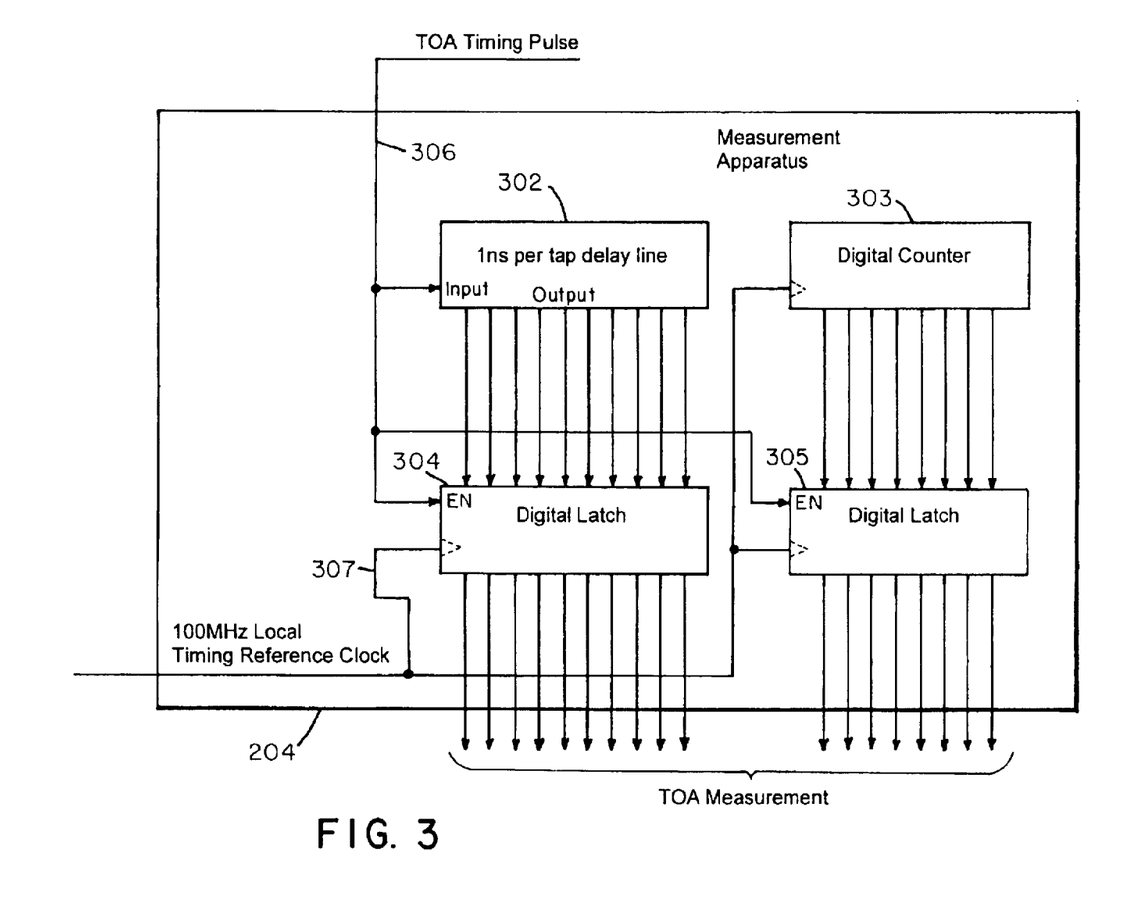
FIG. 3 depicts a measurement apparatus within a monitoring station.

FIG. 3 is a block diagram of an example embodiment of the measurement apparatus 204 (FIG. 2). The TOA timing pulse 306 generated by the packet decoding logic 203 (FIG. 2) is coupled to the input of delay line 302 as well as to the enable input of digital latches 304 and 305. This timing pulse is indicative of the total propagation delay between the tag transmitter and the UWB receiver antenna 218.

The timing pulse is asynchronous with respect to the local timing reference signal. Therefore, following the assertion of the timing pulse, the next rising edge of the local timing reference signal causes the latches to capture the instantaneous outputs of delay line 302 and output of digital counter 303.

Figure 4:
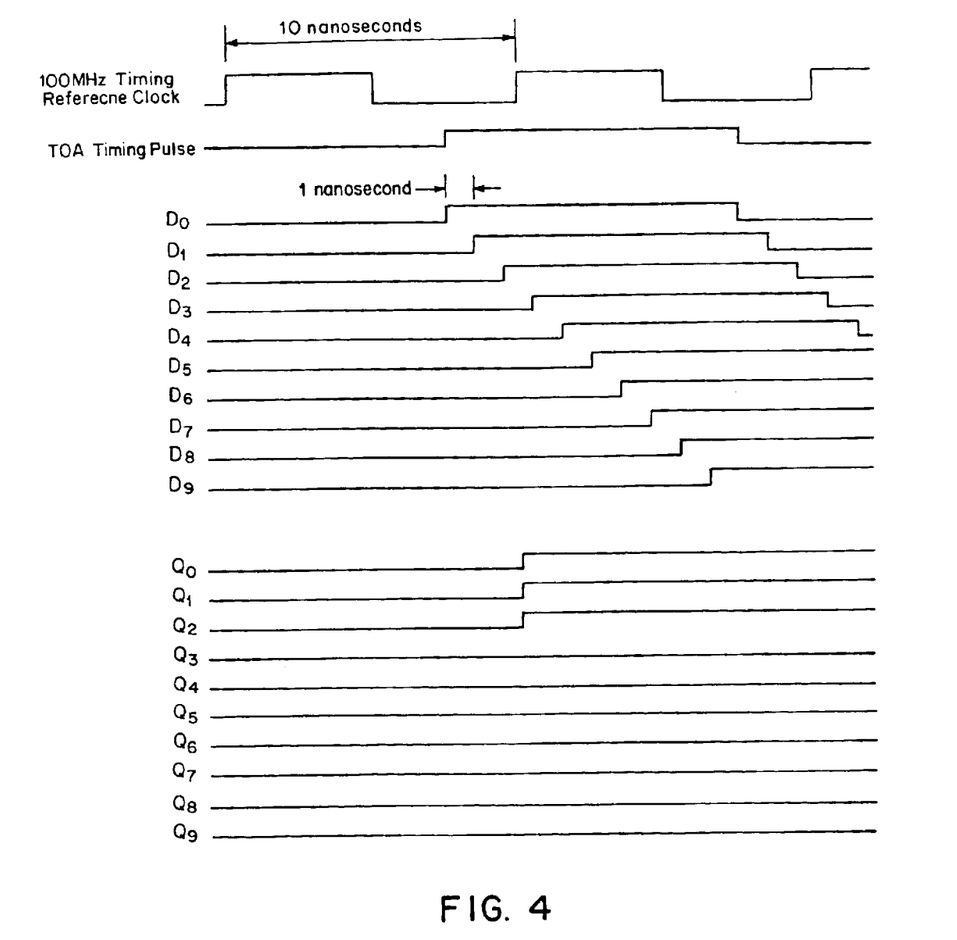
FIG. 4 illustrates waveform diagrams for delay line and latch operations.

In the example of FIG. 3, counter 303 runs at a clock frequency of 100 MHz. Thus, the value of latch 305 has a ten-nanosecond timing resolution. This is too coarse to be used in most applications, thus, an additional delay line 302 is also provided. Delay line 302 allows measurement of fine-resolution timing differences between the TOA timing pulse and the local timing reference signal. In this same example, delay line 302 has a one-nanosecond delay per tap. Delay taps of less than one nanosecond separation can be used to achieve even finer range resolution. Waveforms associated with delay line 302 are shown in FIG. 4, which illustrates waveforms corresponding to the D inputs and Q outputs of latch 304 when the timing pulse arrives three nanoseconds in advance of the rising edge of the local timing reference signal.

Figure 5A:
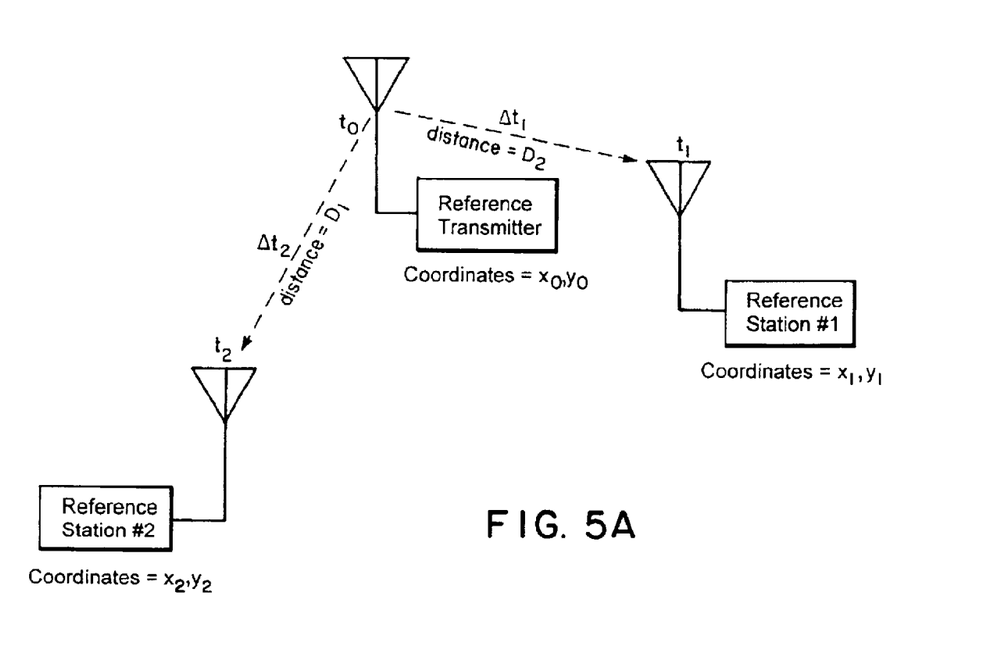
FIGS. 5A and 5B illustrate phase offset between signal counters of respective monitoring stations.
Figure 5B:
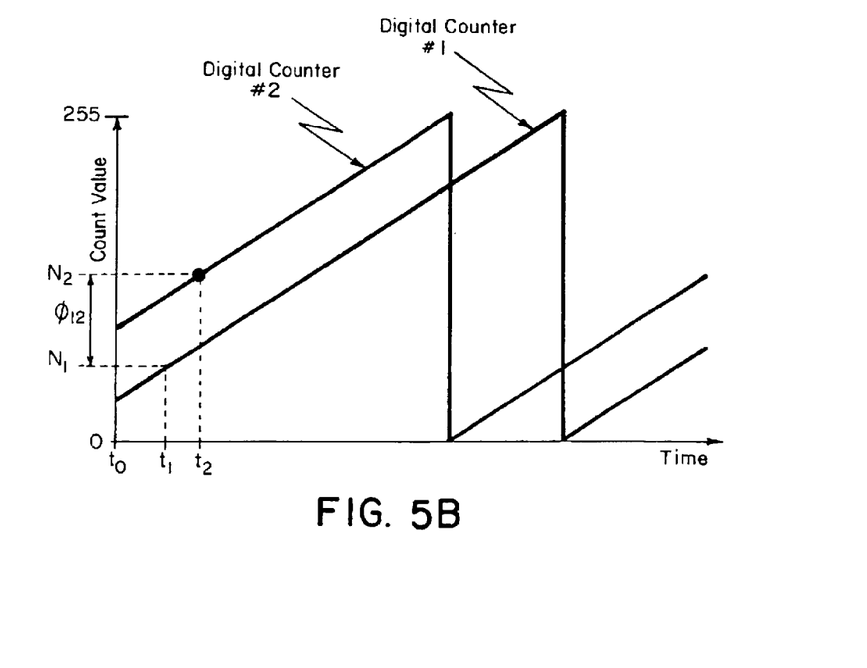

FIGS. 5A and 5B illustrate a phase offset compensation technique in accordance with an aspect of the present invention. In general, there are two forms of synchronization—frequency and phase. In a frequency-synchronized or locked system, such as illustrated herein, there is no relative drift between time measurement apparatus, although there may be a relative fixed phase offset. In other words, a plurality of frequency-locked counters (each located within a separate measurement apparatus 204 (FIG. 2)) preferably count at the same rate. However, the counters are not necessarily aligned to the same count value at any given instant in time. This difference is referred to as relative phase offset and is illustrated by the graph of count values versus time in FIG. 5B. Note that digital counters #1 and #2 associated with the respective waveforms 256 and 257 have different count values at any given point in time.

The problem of phase alignment is typically solved through the use of a counter reset or phase synchronization signal. In contrast, a feature of the present invention includes the use of non-resettable counters. During operation, the counters have random, but constant, phase offsets. To compensate for relative phase offsets, a reference transmitter is positioned at known coordinates. This transmitter transmits a unique ID code to allow the above-described processing algorithm to identify latched count values corresponding to signals received from this particular transmitter. Since the locations of the transmitter and receivers are all known, the exact phase offsets between counters can be readily deduced as described above.

Figure 6A:
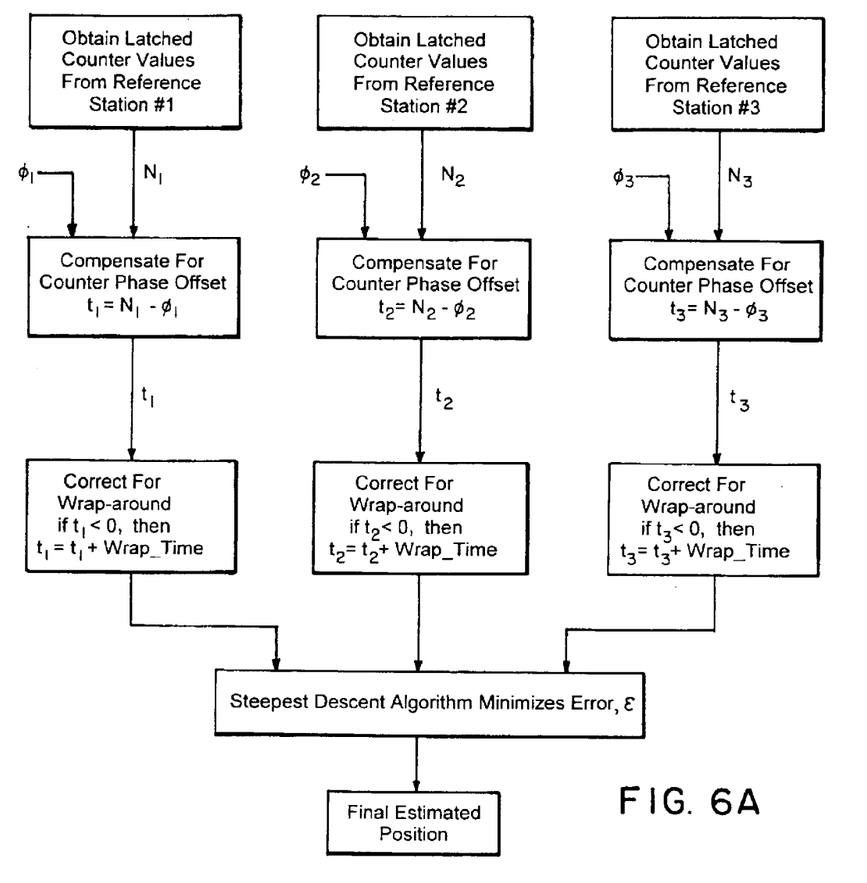
FIG. 6 illustrates a prior method for determining position by solving for the intersection of multiple hyperbolae.

The present invention also includes a method and an apparatus that implements nonlinear optimization techniques, as illustrated in FIG. 6 and as described further below.

(1) A first step of the position determining method is to obtain a count value from each monitoring station N1, N2, N3, etc. (Note that, since an aspect of the present invention permits the use of non-resetable counters, the TOA-measurement data is not an actual time value, but rather a counter value.)

(2) Next, the count values are processed by subtracting phase-offset compensating factors $\phi 1$, $\phi 2$, $\phi 3$, etc. These phase-offset compensating factors were predetermined as described above.

(3) The maximum counter value is then added to any negative time values obtained in the previous step, thereby compensating for counter overflow. At this point, valid time-of-arrival values are available at each monitoring station.

Figure 6B:
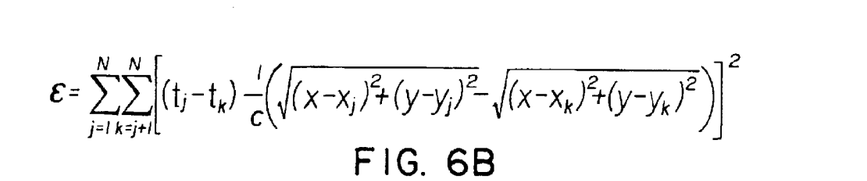

(4) Next, an error term is calculated according to the equation of FIG. 6B. The equation uses the known position coordinates of each monitoring station Xj,Yj along with an initial estimate of the transmitter position X,Y to calculate an error term. The error term is then minimized utilizing a nonlinear optimization technique such as steepest descent, conjugate gradient, Davidon-Fletcher-Powell, Broyden-Fletcher-Goldfarb-Shannon optimization, etc., or any of these techniques in conjunction with an exhaustive search.

Figure 7:
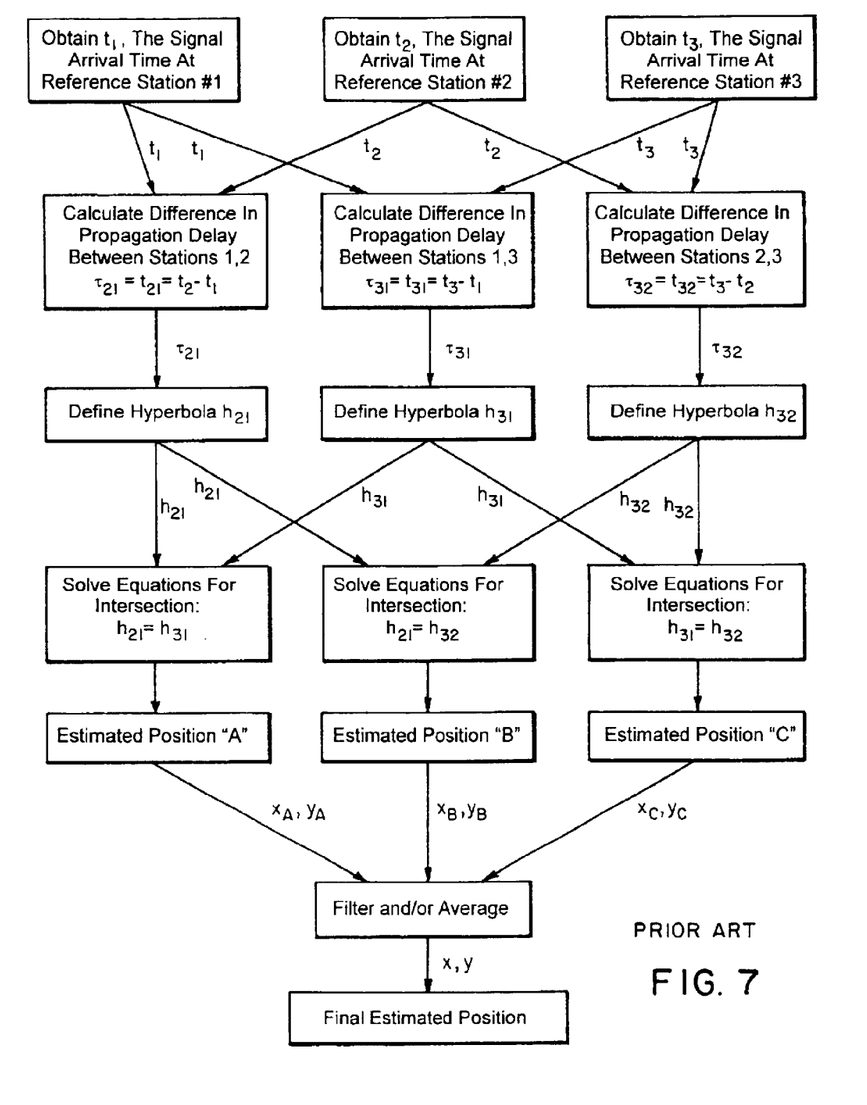
FIG. 7 depicts a method of determining the position of an object in accordance one aspect of the present invention.

FIG. 7 illustrates the algorithmic approach used in a prior system.

Figure 8A:
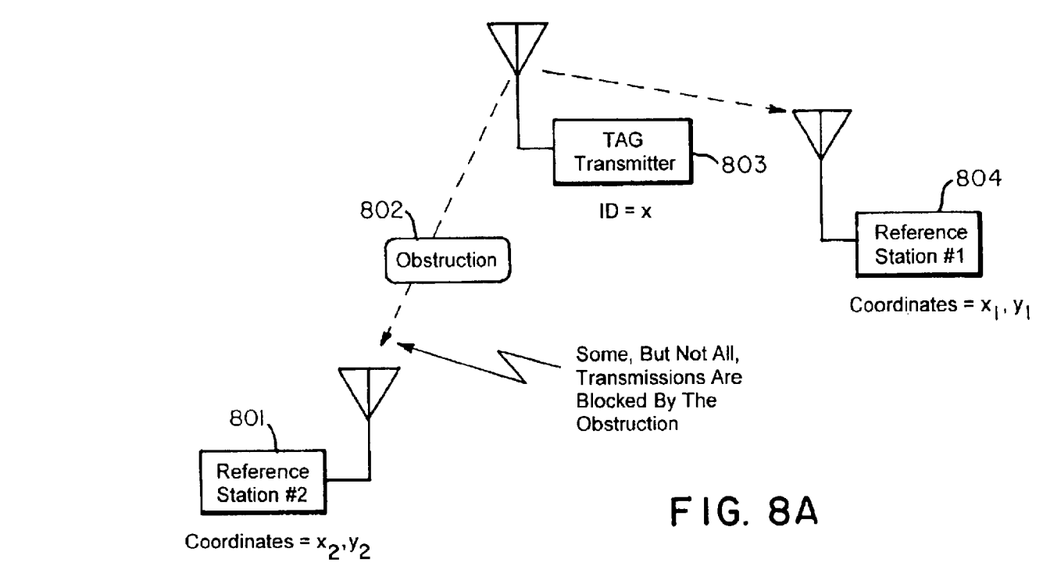
FIGS. 8A, 8B, and 8C illustrate the manner in which a sequential burst count is used to correlate transmissions in accordance with another aspect of the present invention.
Figure 8B:
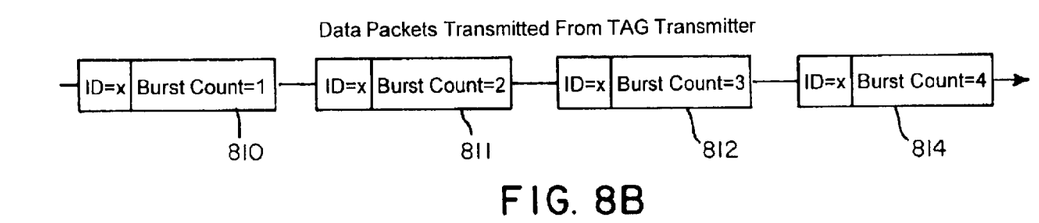

FIG. 8B illustrates the sequential burst count aspect of the present invention. More specifically, each transmitter sends a digital code number that is incremented with each transmission. As will be seen below, this procedure enables the use of a local TOA measurement memory to store data until polled by the location processor.

Note that, particularly in an indoor or urban environment, there may be obstructions that block certain signal paths. The transmitted signal for this path may be unreliable.

Referring to FIG. 8A, the path to monitoring station 801 may be partially blocked by an obstruction 802 and only a subset of the transmissions from the tag transmitter 803 is received. Such transmissions 810, 811, 812, and 814 are illustrated in FIG. 8B. Monitoring station 804, on the other hand, may not be blocked and can receive all of the transmissions 810–814 from the tag 803. In this case, there is a difference (possibly quite large) in the number of TOA arrival times received by each of the two stations 801 and 804, as respectively illustrated in charts 820 and 821.

Figure 8C:
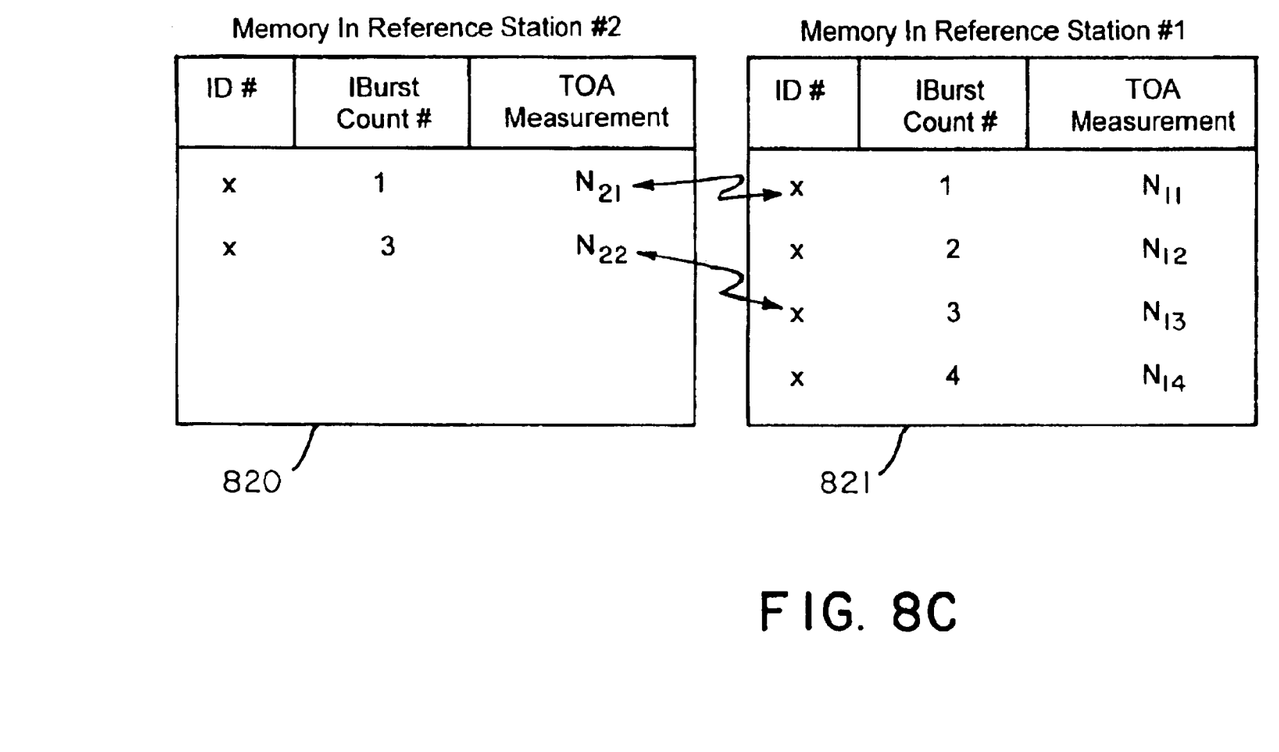

TOA measurement results, then, must be correlated, and this is accomplished by matching the sequential burst count between station pairs. In the example of FIG. 8C, subsequent processing would only operate on data associated with sequential burst count #1 and #3 depicted in charts 820 and 821. Without a correlated sequential burst count, there would be no way to determine which of the four results in the memory of monitoring station #1 should be combined with the two results in the memory of monitoring station #2. However, with the sequential burst count, this ambiguity is resolved.

While the invention has been described with reference to exemplary or preferred embodiments, those skilled in the art will be able to make the various modifications to the illustrated embodiments of the invention without departing from the true spirit and scope of the invention.

We claim:

1. An object location system for determining the position of an object in a monitored region, said system comprising:
   an object tag that transmits a tag signal in the monitored region,
   a reference transmitter having a known location to transmit a reference signal,
   at least two monitoring stations positioned at known locations, each of said monitoring stations being coupled to a common clock source of relatively low frequency and including a respective time counting device being indexed at a relatively higher frequency and cyclically frequency-locked with said common clock source to maintained a fixed offset relative to time counting devices of other monitoring stations, each of said monitoring stations further including a receiver that receives the reference signal and the tag signal, and
   a processor to obtain times of arrival of said tag signals at said monitoring stations, to determine offsets of time counting devices of the monitoring stations, and to determine the position of the object based on said offsets and known locations.

2. An object location system that determines the position of an object, said system comprising an RF tag that transmits a tag signal, a reference transmitter that transmits a reference signal from a known location, plural monitoring stations also positioned at known locations and including respective timers having cycles that are relatively phase-locked with a common clock reference to measure times of arrival of the reference signal and the tag signal, and processor in communication with the monitoring stations to obtain said times of arrival to compute object location based on said known locations and offsets in respective timers relative to each other.

3. The object location system of claim 2, wherein said timer comprises a counter that is indexed at a frequency multiple of said common clock reference and further includes a phase locked loop circuit to relatively lock cycling of said counter with occurrences of clock pulse of said common clock reference.

4. The object location system as recited in claim 3, further including a daisy chained link between said monitoring stations.

5. The object location system as recited claim 4, further including a daisy chained link between said location processor and monitoring stations.

6. The object location system of claim 3, wherein said object comprises at least one of an asset, inventory, and personnel.

7. The object location system as recited in claim 3, wherein said RF rag and reference transmitter includes one of an ultra wideband and a short pulse transmitter.

8. The object location system as recited in claim 3, wherein said location processor uses nonlinear optimization techniques to measure differential times.

9. The object location system as recited claim 3, wherein said location processor includes a routine employing nonlinear optimization techniques to determine object location.

10. The object location system as recited in claim 3, wherein the tag signal further includes at least one of an identification signal, a packet sequence number, and data associated with object.

11. The object location system as recited in claim 3, wherein the tag signal comprises one of a periodic, aperiodic, random, and an externally prompted signal.

12. The object location system as recited in claim 2, wherein respective timers of said monitoring stations include non-resettable counters to measure times of arrival of said tag and reference signals and said timers have an index frequency higher than said common clock reference to provide incremental count values indicative of said times of arrival.

13. The object location system as recited in claim 2, wherein the respective monitoring stations further include a memory that stores a digital representation of times-of-arrival and offset information, and said processor accesses said memory to obtain time of arrival information from said memory to determine the location of the object.

14. The object location system as recited in claim 13, wherein said location processor polls the memory to obtain offset and time-of-arrival information.

15. The object location system as recited in claim 2, wherein the tag signal includes a sequence number, said location processor uses sequence number of said tag signal to correlate data from respective monitoring stations.

16. A method of determining a position of an object in a monitored region, said method comprising:
   transmitting an RF tag signal from an object to be located,
   transmitting a reference signal from a known location,
   providing a common clock signal to respective timers of plural monitoring stations, said timers having an index frequency being a frequency multiple of said common clock signal to provide incremental count values indicative of times of arrival of said tag signal and said reference signal,
   measuring, at the monitoring stations, times of arrival of the reference signal and the tag signal,
   determining relative offsets among timers of the monitoring stations using times of arrival of said reference signal measured in said measuring step,
   adjusting measured times of arrival according to relative offsets among timers of the monitoring stations, and
   determining the position of the object according to the relative offsets and measured times of arrival of the tag signal at the respective monitoring stations.

17. The method of claim 16, further including:
   in said determining step, determining the position of the object using nonlinear optimization techniques to measure differential times of arrival.

18. The method of claim 17, wherein each said transmitting step includes transmitting an ultra wideband signal.

19. The method of claim 18, wherein in said measuring step, utilizing a relatively phase-locked, non-resettable counter that is indexed at an integer multiple of the frequency of said common clock signal to provide incremental count values that measure times of arrival.

20. The method of claim 18, wherein the providing step include daisy-chaining said monitoring stations.

21. The method of claim 18, wherein in said first transmitting step, said tag signal further includes at least one of a tag ID, a sequence number, and information associated with the object to be located.

22. The method of claim 21, further including transmitting the tag signal by at least one of periodically, aperiodically, randomly, and according to an external event.

23. The method of claim 18, further including storing digital representations of measured times of arrival in a memory located at the monitoring stations, and sending said digital representations to a processor for subsequent determination of object location.

24. The method of claim 18, further including transmitting a sequence number with said tag signal in order to provide a basis for a processor to correlate respective tag signals stored at respective monitoring stations when determining object location in noisy environments.

25. A method of determining a position of an object in a monitored region, said method comprising:
   transmitting an RF tag signal from the object to be located,
   transmitting a reference signal from a fixed location,
   receiving the RF tag signal and the reference signal at fixed monitoring stations,
   providing a common clock signal to plural monitoring stations,
   at said fixed monitoring stations, generating incremental count values using a counter having a cycle that is relatively phase-locked with, and index at a frequency relatively higher than a frequency of said common clock source to measure, times of arrival of the reference signal and the tag signal, and
   determining the position of the object according to times of arrival of the tag signal at the respective monitoring stations.

26. The method of claim 25, further including transmitting said common clock source to said monitoring stations via an network data line.

27. The method of claim 26, further including using nonlinear optimization techniques to measure differential times of arrival.

28. The method of claim 27, wherein said RF tag signal comprises an ultra wideband pulse.

29. The method of claim 27, where the RF tag signal comprises a short wide band pulse.

30. The method of claim 26 further comprising using a counter being indexed at an integer multiple frequency of said common clock source to measure times of arrival.

31. The method of claim 26, further including daisy chaining the monitoring stations via said network data line.

32. The method of claim 26, further including transmitting with the tag signal at least one of an ID code, sequence number, and information associated with the object.

33. The method as recited in claim 26, further including storing digital representations of offset and time of arrival data in memory located within the monitoring stations and sending said data via a local area network to a processor that determines object location.

34. The method as recited in claim 33, wherein a processor polls said memory to obtain said data.

35. The method as recited in claim 33, further including said processor utilizing sequence numbers of multiple tag signals to correlate data obtained from the respective monitoring stations in order to determine object location.

36. In an object location system for determining a position of an object, said system comprising an RF tag that transmits a tag signal, a reference transmitter that transmits a reference signal from a known location, plural monitoring stations to receive the tag signal and the reference signal, and a location processor in communication with the monitoring stations to determine object location based on measured times of arrival, the improvement comprising:
   a daisy-chained clock source applied to each monitoring station, each said monitoring station having a high-frequency timer indexed at a frequency multiple of said clock source and a phase locking circuit to lock relative phase relation between cycles of said timer and said clock source, said high-frequency timer being operative to measure times of arrival of the reference signal and the tag signal, and
   said location processor being operative to determine object position using nonlinear optimization techniques to measure differential times of arrival of said tag signals at said monitoring stations.

37. In a system for determining a position of an object, said system comprising an RF tag that transmits a tag signal, a reference transmitter that transmits a reference signal from a reference station positioned at known location, and plural linked monitoring stations positioned at known locations and that include a receiver that detects relative times of arrival of the reference signal and the tag signal, the improvement comprising:

a time-of arrival processor located at each monitoring station to measure times of arrival of the reference signal, said time of arrival processor including a counter being indexed at a frequency multiple of and relatively phase-locked in cycles with a common clock, and a location processor to determine relative timing offsets among monitoring stations based on known distances from the reference station and that determines object position according to said offsets and times of arrival of said tag signal.

38. The improvement of claim 37, wherein the tag signal comprises an UWB pulse that includes at least one of an ID code, a sequence number, and data associated with the object.

39. The improvement of claim 37, wherein the time-of-arrival processor comprises a counter to measure times of arrival.

40. The improvement of claim 39, wherein digital representations of offset and times of arrival are stored in a memory located within each monitoring station, and said memory is accessed by the location processor to determine the location of the object.

41. The improvement of claim 40, wherein the location processor uses a sequence number of the tag signal to correlate data from respective monitoring stations.

42. A system to determine a location of an object that emits a UWB signal, said system comprising:

a clock source that generates periodic clock pulses at a fixed-frequency, at least two monitoring stations positioned at known locations each including an incremental time counter having an index frequency higher than said fixed frequency to measure arrival times of UWB signals in discrete increments of time and a phase-locking circuit to lock cycles of said counter with clock source, a reference transmitter also positioned at a known location to transmit a reference signal that effects latching of incremental time values indicative of times of arrival of the reference signal at the monitoring stations, and a processor that utilizes the incremental time values to determine relative offsets between respective timers of the monitoring station based on known locations thereof and to determine the location of the object based on said relative offsets and times of arrival of the UWB signal at the monitoring stations.

43. The system of claim 42, further comprising an network data line to convey the clock pulses to the monitoring stations.

44. The system of claim 43, wherein said data line conveying said clock pulses is daisy-chained to multiple monitoring stations.

45. The system of claim 44, further comprising a LAN connection between the processor and the monitoring stations to covey a digital representation of said time values.

46. The system of claim 42, wherein each incremental time counter comprises a non-resettable cyclic counter having a count index frequency being a multiple of said fixed-frequency of the clock source, whereby said count index frequency defines position resolution of object location.

47. The system of claim 46, further comprising a PLL multiplier responsive to said clock source to index said counter at a multiple of said fixed frequency.

48. The system of claim 46, wherein respective counters of the monitoring stations latch respective time values to detect arrival of the UWB signal, and said processor obtains and utilizes respective time values of the monitoring stations to locate the object.

49. The system of claim 42, wherein each said incremental time counter further includes a delay line having multiple taps to further increase resolution accuracy of object location.

50. The system of claim 42, wherein said reference signal includes a identification component to enable identification thereof prior to latching a time value indicative of receipt of a signal, and said processor utilizes said identification component to match respective pairs of offsets obtained from the monitoring stations.

51. The system of claim 50, wherein said reference signal comprises a data packet comprising a series of UWB pulses that provide framing bits to enable extraction and identification of a unique bit sequence from the reference signal.

52. The system of claim 42, wherein the incremental time counters said monitoring stations are phase-locked relative to each other by frequency locking cycling of the time counters of the monitoring station with the clock source.

53. The system of claim 42, further comprising an identification code associated with the object UWB signal to identify the object.

54. The system of claim 53, further comprising digital data embedded within the UWB signal to provide information associated with said object.

55. The system of claim 53, further comprising a timing circuit associated with transmission of said object UWB signal to adjust an interval between successive packet transmissions of the object thereby to reduce the chance of data collisions when multiple objects transmit packets.

56. The system of claim 53, further including a memory located within each monitoring station and said processor polls said monitoring station to obtain timing and identification information about the reference tag and the object.

57. The system of claim 56, further including a network interface at said monitoring stations, and said processor communicates with said network interface via a local area network to obtain said information and to command the monitoring station to alter an operational characteristic thereof.

58. The system of claim 57, wherein said operational characteristic includes at least one of gain and detection threshold applied to received signals.

59. A method of locating an object comprising the steps of:

positioning multiple monitoring stations at known locations, transmitting a UWB tag signal from the object, generating a periodic clock signal of a relatively low fixed-frequency, at the monitoring stations, receiving the periodic clock signal and phase-locking respective incremental timers of the monitoring stations relative to each other using said periodic clock signal, said timers operating at a relatively higher frequency than said periodic clock signal to provide discrete count values indicative of times of arrival of received signals, transmitting a reference signal from a known location to effect latching of respective count values at the monitoring stations indicative of times of arrival of the reference signal, determining relative offsets in the incremental timers of the monitoring stations based on the known locations and count values associated with receipt of the reference signal at respective monitoring stations, and locating the object based on the relative offsets and times of arrival of the UWB tag signal at the respective monitoring stations.

60. A method of locating an object comprising:

positioning multiple monitoring stations at known locations, transmitting a UWB tag signal from the object, generating a fixed-frequency clock signal, receiving and utilizing the fixed-frequency clock signal at the monitoring stations to relatively phase-lock cycling of respective counters of the monitoring stations relative to each other utilizing the fixed-frequency clock signal to frequency-lock cycling of the respective counters, said counters being indexed at a frequency multiple of said fixed frequency clock signal to generate and latch count values indicative of times of arrival of received signals, transmitting a reference signal from a known location to effect latching of count values indicative of times of arrival of the reference signal at the monitoring stations, determining relative offsets in the counters of the monitoring stations based on the known locations and count values associated with receipt of the reference signal at respective monitoring stations, and locating the object based on the relative offsets and times of arrival of the UWB tag signal at the monitoring stations.

61. A system to locate an object that transmits a tag signal, said system comprising:

a primary clock to generate periodic clock pulses of a relatively low fixed frequency, at least two monitoring stations positioned at known locations, each of said monitoring stations including a secondary clock of relatively high frequency to produce count values indicative of times of arrival and a phase-locking circuit to lock cycle in intervals of the secondary clock with occurrences of said periodic clock pulses of the primary clock whereby to maintain a constant phase offset between cycles of respective secondary clocks of the monitoring stations, a reference transmitter also positioned at a known location to transmit a reference signal that effects latching of clock count values indicative of times of arrival of the reference signal at the monitoring stations, and a processor that obtains digital representations of the count values from the monitoring stations to determine offsets between the secondary clocks of the monitoring stations based on the known locations and to locate the object based on the offsets and times of arrival of the tag signal at the monitoring stations.

62. The system of claim 61, wherein said secondary clock of each monitoring station comprises a non-resettable cyclic counter having an index frequency being a multiple of said relatively low fixed frequency of the primary clock.

63. The system of claim 62, wherein said secondary clock further includes a multi-tapped delay line to measure further increments of time.

64. The system of claim 61, further including an network cable to convey said periodic clock pulses of the primary clock to said monitoring stations.

65. The system of claim 64, wherein the frequency of said primary clock is ten MHz and the index frequency of said secondary clock is a multiple thereof.

* * * * *